United States Patent [19]

Smith

[11] Patent Number: 4,607,181

[45] Date of Patent: Aug. 19, 1986

[54] HIGH TEMPERATURE SUBMERSIBLE ELECTRIC MOTOR

[75] Inventor: Martin K. Smith, Wilton, Conn.

[73] Assignee: Hayward Tyler Inc., Norwalk, Conn.

[21] Appl. No.: 678,644

[22] Filed: Dec. 6, 1984

[51] Int. Cl.⁴ ............................................. H02K 5/10
[52] U.S. Cl. ........................................ 310/87; 310/64;
310/90; 165/104.32; 165/185; 184/99; 415/175;
415/501
[58] Field of Search ..................... 310/87, 88, 90, 85,
310/88, 42, 64; 165/104.33, 185 R; 420/577,
580; 415/175, 501; 184/6.18, 98, 99

[56] References Cited

U.S. PATENT DOCUMENTS

| | | | |
|---|---|---|---|
| 72,176 | 12/1867 | Draper | 420/577 |
| 2,293,616 | 8/1942 | Myers | 310/87 |
| 2,354,874 | 8/1944 | Myers | 310/87 |
| 3,135,211 | 6/1964 | Pezzillo | 310/87 |
| 3,135,884 | 6/1964 | Luenberger | 310/87 |
| 3,196,795 | 7/1965 | Baker | 417/50 |
| 3,414,405 | 12/1968 | Fisher | 420/577 |
| 3,421,445 | 1/1969 | Ivanoff | 415/177 |
| 3,759,635 | 9/1973 | Carter | 310/87 |
| 3,770,635 | 11/1973 | Atendido | 310/87 |
| 4,262,226 | 4/1981 | Erickson | 310/87 |
| 4,275,319 | 6/1981 | Davis, Jr. | 310/87 |

Primary Examiner—R. Skudy
Attorney, Agent, or Firm—Roberts, Spiecens & Cohen

[57] ABSTRACT

A glandless submersible electrical dynamo operative at high temperatures comprising a casing containing a stator and a rotor and a metal alloy filling the space within the casing. The metal alloy is liquid at the operating temperatures of the pump and is an alloy of bismuth, preferably with lead or tin. The bismuth is present in an amount of between 40-60% and the alloy has the property of substantially no volume change upon solidification.

7 Claims, 1 Drawing Figure

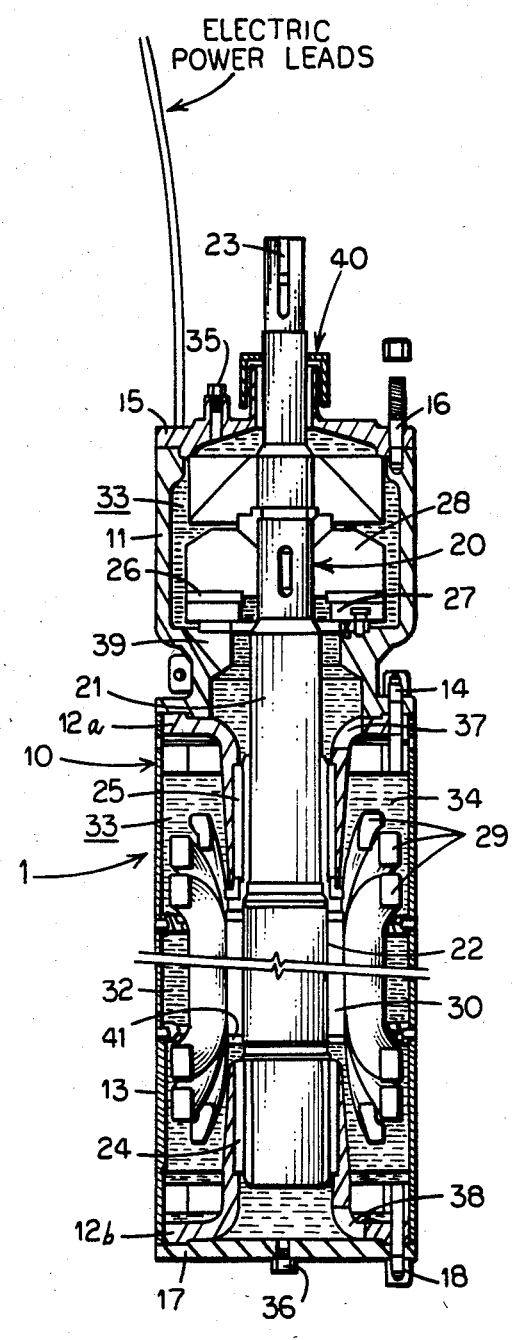

HIGH TEMPERATURE SUBMERSIBLE ELECTRIC MOTOR

FIELD OF THE INVENTION

The invention relates to a submersible electric motor which is operative at high temperatures which utilizes a special filling fluid.

BACKGROUND OF THE INVENTION

Presently known submersible motors are submerged motors which utilize a filling fluid of either an oil or water type mixture to satisfy a number of functions including dielectric insulation, bearing lubrication, heat transfer and pressure transmission.

The conventional fluids have a number of disadvantages especially at higher temperatures (150° F. and above). Water or water-glycerine mixtures, in particular, exhibit very poor lubricating properties and liberate entrained gasses. Also, they boil as higher temperatures are encountered. Oils offer the advantages of good dielectric properties, higher gassing and boiling points and better lubricating characteristics, but do not equal the properties of water such as heat transfer, low thermal expansion rate or viscosity/pressure characteristics. They also require substantial sealing means to prevent the ingress of the process fluid in which the machine is submerged.

INFORMATION DISCLOSURE STATEMENT

U.S. Pat. No. 2,354,874—(Myers) discloses the use of heavy fluids as a barrier between the ambient environment and oil which fills the motor. The heavy fluids are mercury and carbon tetrachloride. As such, Myers is concerned with the design of a sealing system for a motor which can only operate with the seal intact. Additionally, Myers relies on a compensation system to equalize external and internal pressures, as a pressure difference would result in upset of the mercury and immediate failure of the motor as well as possible contamination of the environment.

U.S. Pat. No. 3,135,884—(Luenberger) relates to a "canned" or hermetically sealed type of motor in common use today. It relies on a thin metal or plastic can to keep the insulating oil in the windings and keep aggressive environment out. Further, it relies on rotating seals and pressure compensation devices to ensure long life.

U.S. Pat. No. 3,421,445—(Ivanoff) describes a device for reducing thermal distortion in glandless motor pumps where a large temperature differential exists between the pump and the motor.

U.S. Pat. No. 3,759,635—(Carter et al) describes an electromagnetic pump for pumping molten metals.

U.S. Pat. No. 3,770,635—(Atendido et al) discloses a complex sealing and compensating system and a particular motor filling fluid, namely, a non-electrically conducting solution of a fluoro-aliphatic radical-substituted polymer in a normally liquid fluorinated solvent. The construction relies on the seal and compensator to maintain its integrity.

U.S. Pat. No. 4,262,226—(Erickson) is concerned with preventing ingress of environmental fluid under difficult ambient conditions. It solves the problem by maintaining a higher oil pressure within the motor by external pressurization from the surface which can be several thousand feet away. This means that a compensator is not required and that the seal always leaks outwards. This system has the disadvantage of pollution from constantly escaping oil, and the problem of maintaining the overpressure.

U.S. Pat. No. 4,275,319—(Davis) describes improvements in insulating systems used in an oil-filled submersible motor. It relies on oil for insulation of the stator conductors and thus relies on a seal and a compensator for its electrical integrity.

SUMMARY OF THE INVENTION

An object of the invention is to provide a submersible motor of simple construction which can be used in high pressure, high temperature aggressive environments such as oil wells and geothermal bore holes.

Yet another object of the invention is to provide a motor which uses a liquid metal filling which eliminates the need for seals and volume compensation devices.

According to a feature of the invention, the liquid metal filling fluid has a relatively high density which eliminates the need for a seal and it has negligible volume change due to temperature or pressure effects which eliminate the need for pressure and temperature compensation.

Still another object of the invention is to provide a submersible motor which can be operated under aggressive conditions and at temperatures where conventional water and oilfilled constructions have not been successfully operated.

In accordance with the above and further objects of the invention, there is provided a submersible motor which is operative at high temperatures and which comprises a casing, a stator in the casing and a rotor rotatably supported by bearing means within the casing. The casing forms a space therein around the rotor and the stator is disposed in this space.

In accordance with the invention, a metal alloy fills the aforesaid space, said alloy being liquid at the operating temperatures of the pump.

The metal alloy has a low melting point on the order of between 150°-250° F. and compared to water or oil is incompressable and has a very low coefficient of thermal expansion.

In further accordance with the invention, the metal alloy has substantially no shrinkage upon solidification.

According to a feature of the invention, the metal alloy contains bismuth and preferably is an alloy of bismuth and lead or tin.

In further accordance with the invention, the stator assembly is contained within an outer container which is resistant to corrosion by the metal alloy.

In accordance with a further feature of the invention, the metal alloy has a high density which makes it resistant to pollution with abrasives such as sand, rocks and the like whereby the need for seals or pressure compensation devices is eliminated.

BRIEF DESCRIPTION OF THE DRAWING

The sole Figure of the drawing is a sectional view of a submersible motor according to the invention which is broken in length and adapted for being operated in vertical attitude.

DETAILED DESCRIPTION OF THE EMBODIMENT OF THE INVENTION

The drawing illustrates an electric dynamo in the form of a motor adapted for being placed in adverse environments such as geothermal deep wells for dewatering.

The motor is intended for being operated at relatively high temperatures between 150°–450° F.

The motor, designated by numeral 1 in the drawing, is intended to drive a pump which can be integrally secured therewith in order to pump liquid from the well.

The motor 1 comprises a casing 10 including an upper housing portion 11, lower housing portions 12a and 12b, and a cover or casing member 13 which is secured to the housing portions 12a and 12b. The upper housing portion 11 is secured to the lower housing portion 12a by suitable connectors such as bolts 14. A top cover 15 is connected by bolts 16 to the housing portion 11 and a lower cover 17 is secured to the lower housing portion 12b by bolts 18. Electrical power leads extend from a power supply(not shown) to the top cover 15.

A rotor assembly 20 is rotatably mounted within the motor casing 10.

The rotor assembly 20 comprises a rotor shaft 21 which carries rotor laminations 22 thereon. The upper end of the shaft 21 is slotted, as shown at 23, or otherwise configured in order to engage the shaft of a pump(not shown) which is driven by the motor in order to provide a pumping action on liquids in which the motor and pump are immersed. As is conventional, the housing of the pump is secured to the housing of the motor so as to form a common assembly therewith.

In order to rotatably support the rotor assembly within the motor casing, there are provided radial bearings 24 and 25 disposed axially along the rotor shaft 21 and thrust bearings 26 mounted on thrust pads 27 supported by the upper housing portion 11. Secured to the rotor is a self-aligning thrust disk 28 which rests on thrust bearings 26. The radial bearings 24 and 25 can be made of ceramic or graphite.

Fixedly secured to the motor casing is a stator assembly comprising stator laminations 32 and windings 29. The individual windings are continuously covered by an electrically insulating material such as conventional plastics, as Teflon or cross-linked polyethylene such that the conductors are totally insulated to ground.

Mounted on the rotor shaft 21 are the rotor laminations 22. The rotor laminations 22, rotor bars 30 and short circuit rings 41 form an assembly or pack within the flux field of the windings 29 and in this embodiment comprise a squirrel cage assembly.

A container or can 31 surrounds and hermetically encloses the assembly of the lamination 22, rotor bars 30 and short circuit rings 41 for a purpose to be explained more fully later.

The casing 10 forms a space 33 therein around the rotor asssmbly and in accordance with the invention the space 33 is filled with a metal alloy 34. A fill plug 35 is disposed in the cover 15 for introduction of the metal alloy 34 into the space 33. A drain plug 36 is disposed in the bottom cover 17 for draining the liquid alloy 34 from the space 33. The lower housing portions 12a and 12b are respectively provided with apertures 37 and 38 for passage of the alloy therethrough. An aperture 39 is provided in the upper housing portion 11 for the same purpose. At the top of the rotor shaft there is disposed a flinger 40 which prevents sand and other particles in the ambient environment from settling on the liquid metal alloy 34 surface.

In accordance with the invention, the metal alloy 34 is a low temperature fusible metal alloy of bismuth, preferably with lead or tin.

Bismuth is present in the alloy in an amount between 40–60% and has the notable property of being one of a few substances (water and antimony being two others) which expand on solidification. By maintaining the amount of bismuth in the alloy at between 40–60%, the property of expansion on solidification can negate the contraction upon solidification of the other metals in the alloy so that the resultant alloy has substantially no volume change upon solidification or liquification. This can be achieved with lead and tin, both of which contract upon solidification, and the resulting alloy has extremely low volume to phase change characteristics.

The addition of expensive and scarce elements, such as indium and gallium, can be used to alter the physical properties as well as the resistance of the alloy to corrosion and also to modify the melting point. The amount of the indium and gallium to be added is within the control of those skilled in the art and is a function of the desired properties and temperature considerations and in general will amount to less than 3–5%.

According to a particular embodiment of the invention, the metal alloy is composed of 55.5% bismuth and 44.5% lead and is designated as a 255° F. Eutectic.

The use of such alloy eliminates the problems of using oil or water under high temperature conditions because of the particular properties of the alloy inclusive of the following:

(a) High boiling point
(b) High heat transfer coefficient
(c) Low coefficient of thermal expansion
(d) High viscosity at high temperatures
(e) High density.

The significance of the aforesaid properties in comparison with water and a typical oil is made clear from the following table which sets forth a comparison of a number of properties:

TABLE I

| Parameter | Unit | Water | Typical Oil | 255° Eutectic |
| --- | --- | --- | --- | --- |
| Boiling Point | °C. | 100 | 245 | 1650 |
| Heat Transfer Coefficient | Cal/Sec/ CM. °C. | .0018 at 21° C. | .00004 at 38° C. | .026 at 300° C. |
| Coefficient of Thermal Expansion | Δl/°C. | .00021 | .0008 | .000022 |
| Viscosity | Centipoises | 0.8 at 30° C. | <3 at 115° C. | 1.7 at 332° C. |
| Density | gm/cu. cm. | 0.998 | 0.886 | 10.52 |

The use of the bismuth alloy obviates a number of problems associated with high temperature motor operation but introduces a problem due to the corrosive nature of the bismuth alloy. In this respect, low temperature fusible metal alloys have the tendency to dissolve most noble metals, including copper and bronze; since the rotor bar and short circuit ring material is usually copper and since bearing materials are usually made of bronze, it is necessary to provide suitable means to prevent corrosive effects of the metal alloy against the copper and bronze constituents. Moreover, stainless steel is also subject to attack by the fusible alloy which eliminates the use of this material.

In order to eliminate the problem of the corrosive property of the metal alloy, the rotor laminations, short-circuit rings and assembly are completely enclosed by the container 31 which is made of Inconel (a stainless steel having the following composition: Ni 76; Cu 0.2; Fe 7.5; Cr 15.5; Si 0.25; Mn 0.25; C 0.08; and S 0.007) or similar material which is seal welded at its ends to prevent contact between the components of the rotor elements and the fluid 34. Techniques, such as commonly employed in hermetically sealed chemical pumps, can be relied upon to isolate the critical elements of the rotor from the metal alloy.

The materials of the bearings 24,25 and 26 should not be of bronze, which can be attacked. The bearings are of sliding contact type, preferably plain sleeve type bearings utilizing non-metallic ceramic or graphite bushes running against hardened steel or chrome plated journal sleeves. Such construction will avoid any corrosion by contact with the metal alloy 34.

For applications in aggressive environments, a coated, clad or double shell arrangement may be necessary for the motor casing 10 due to the lack of suitability of any one metal for the external aggressive environment and the internal aggressive environment.

because of its high density, it is virtually unaffected by abrasives, such as sand or rocks, which will float on the metal alloy. The high density also obviates the need for seals or pressure compensation devices and accordingly the motor is of glandless construction since the metal alloy at operating temperatures of the dynamo provides lubrication of bearings as well as heat transfer and power transmission.

Although the invention has been disclosed in relation to a specific embodiment thereof, it will become apparent to those skilled in the art that numerous modifications and variations can be made within the scope and spirit of the invention as defined in the attached claims.

I claim:

1. A submersible electrical dynamo operative at high temperatures comprising a casing, a stator in said casing transmission, a rotor including a rotor pack operatively associated with said stator, said rotor pack including rotor laminations, bearing means rotatably supporting said rotor in said casing, said casing forming a space therein around said rotor assembly, said stator being in said space, and a metal alloy filling said space, said alloy being liquid at the operating temperatures of said dynamo, to provide lubrication of said bearing means, and to provide heat transfer and pressure transmission said alloy containing bismuth in an amount such that the alloy has substantially no volume change upon solidification.

2. An electrical dynamo as claimed in claim 1 wherein the metal alloy is an alloy of bismuth and lead or tin.

3. An electrical dynamo as claimed in claim 2 wherein the bismuth is present in an amount of between 40 and 60%.

4. An electrical dynamo as claimed in claim 3 wherein the alloy further contains tin, lead and indium or gallium.

5. An electrical dynamo as claimed in claim 1 wherein said rotor further includes an outer container sealingly enclosing said rotor pack and resistant to corrosion by said alloy.

6. An electrical dynamo as claimed in claim 5 wherein said bearing means comprises sliding contact bearings comprising non-metallic material.

7. An electrical dynamo as claimed in claim 1 which provides small clearance between the rotor and the casing, said alloy being of high density to prevent ingress of material from outside the casing.

* * * * *